(12) United States Patent
Park et al.

(10) Patent No.: US 10,724,394 B2
(45) Date of Patent: Jul. 28, 2020

(54) STEAM TURBINE AND METHOD OF ASSEMBLING AND DISASSEMBLING THE SAME

(71) Applicant: DOOSAN HEAVY INDUSTRIES & CONSTRUCTION CO., LTD., Changwon-si, Gyeongsangnam-do (KR)

(72) Inventors: Kooha Park, Busan (KR); Hyunchul Lee, Changwon-si (KR)

(73) Assignee: Doosan Heavy Industries Construction Co., Ltd., Gyeongsangnam-do (KR)

( * ) Notice: Subject to any disclaimer, the term of this patent is extended or adjusted under 35 U.S.C. 154(b) by 149 days.

(21) Appl. No.: 15/935,057

(22) Filed: Mar. 26, 2018

(65) Prior Publication Data
US 2018/0340443 A1 Nov. 29, 2018

(30) Foreign Application Priority Data
May 23, 2017 (KR) .......................... 10-2017-0063415

(51) Int. Cl.
*F01D 25/28* (2006.01)
*F01D 17/14* (2006.01)
*F16L 23/00* (2006.01)

(52) U.S. Cl.
CPC ......... *F01D 17/145* (2013.01); *F01D 25/285* (2013.01); *F16L 23/003* (2013.01);
(Continued)

(58) Field of Classification Search
None
See application file for complete search history.

(56) References Cited

U.S. PATENT DOCUMENTS 3,730,537 A 5/1973 Ward et al.
3,768,776 A 10/1973 Straslicka
(Continued)

FOREIGN PATENT DOCUMENTS

CN 102554869 B 6/2014
JP 2007170630 A 7/2007
(Continued)

OTHER PUBLICATIONS

Korean Office Action issued by the Korean Intellectual Property Office dated May 8, 2018 in connection with Korean Patent Application No. 10-2017-0063415.
(Continued)

*Primary Examiner* — Michael Lebentritt
(74) *Attorney, Agent, or Firm* — Invenstone Patent, LLC

(57) ABSTRACT

A steam turbine includes a turbine main body supplied with steam from a steam supply unit and a steam valve for controlling an amount of steam to be supplied from the steam supply unit to the turbine main body. The turbine main body includes a first connection unit; and pluralities of guide rods and threaded rods, each extending from the first connection unit. The steam valve includes a second connection unit configured to be coupled to the first connection unit; and a flange disposed around the second connection unit, to receive the guide rods and threaded rods through corresponding through-holes respectively formed in the flange. The first connection unit includes an inner circumference and an end surface provided around the inner circumference, and the guide rods and threaded rods are arranged symmetrically around the inner circumference of the first connection unit and are fixed to the first connection unit.

20 Claims, 14 Drawing Sheets

(52) U.S. Cl.
CPC ...... *F05D 2220/31* (2013.01); *F05D 2230/60* (2013.01); *F05D 2230/64* (2013.01); *F05D 2230/70* (2013.01)

(56) References Cited

U.S. PATENT DOCUMENTS

| | | | | |
|---|---|---|---|---|
| 4,052,045 A | * | 10/1977 | Shaddix | F16L 23/003 269/43 |
| 4,395,885 A | * | 8/1983 | Cozby | F01K 11/00 60/660 |
| 4,842,244 A | * | 6/1989 | Panchison, Jr. | F16K 31/1635 251/26 |
| 5,213,306 A | * | 5/1993 | Lageder | F16K 15/03 251/298 |
| 5,882,511 A | * | 3/1999 | Blomquist | F16L 37/23 165/119 |
| 6,099,246 A | | 8/2000 | Lochner et al. | |
| 7,421,783 B2 | * | 9/2008 | Namburi | F01D 25/24 29/525.01 |
| 8,534,713 B2 | * | 9/2013 | Takeda | F16L 23/003 285/123.1 |
| 8,684,677 B1 | * | 4/2014 | Mann | F01D 17/165 415/158 |
| 9,267,615 B1 | * | 2/2016 | Corte, Jr. | F16K 99/00 |
| 2003/0150493 A1 | * | 8/2003 | Glover | F16K 15/028 137/515.7 |
| 2009/0035092 A1 | * | 2/2009 | Thiemann | F16B 33/00 411/424 |
| 2011/0131781 A1 | * | 6/2011 | Smith | B23B 29/02 29/281.1 |
| 2012/0042492 A1 | | 2/2012 | Merrill et al. | |
| 2015/0322812 A1 | * | 11/2015 | Futahashi | F01D 17/10 60/660 |
| 2017/0037714 A1 | * | 2/2017 | Schmitt | E21B 43/129 |

FOREIGN PATENT DOCUMENTS

| | | |
|---|---|---|
| KR | 20-2009-0003491 U | 4/2009 |
| KR | 10-1624054 B1 | 5/2016 |
| KR | 101657698 B1 | 9/2016 |
| KR | 20170029651 A | 3/2017 |
| WO | 85/03986 A1 | 9/1985 |
| WO | 2013/181704 A1 | 12/2013 |

OTHER PUBLICATIONS

An European Search Report dated Oct. 1, 2018 in connection with European Patent Application No. 18167458.1 which corresponds to the above-referenced U.S. application.

* cited by examiner

STEAM TURBINE AND METHOD OF ASSEMBLING AND DISASSEMBLING THE SAME

CROSS-REFERENCE TO RELATED APPLICATION

This application claims priority to and the benefit of Korean Patent Application No. 10-2017-0063415 filed in the Korean Intellectual Property Office on May 23, 2017, the entire contents of which are incorporated herein by reference.

BACKGROUND OF THE INVENTION

Field of the Invention

The present invention relates to a steam turbine and a method of assembling and disassembling the same.

Description of the Related Art

A steam turbine, which is used in a steam power plant or a nuclear power plant, is provided with a plurality of steam valves configured to control the amount of steam depending on a change in load or to interrupt the supply of steam when the steam turbine malfunctions. In general, a steam valve includes a main steam stop valve and a steam addition and reduction valve. The main steam stop valve is an ON/OFF valve configured to stop or allow the flow of steam. For example, the main steam stop valve is closed to interrupt the introduction of steam into the steam turbine when power generation is stopped. The steam addition and reduction valve is a flow control valve configured to control the flow rate of steam that is introduced into the steam turbine.

When the steam turbine is assembled or disassembled, the steam valve must be coupled to or separated from a turbine main body in which a turbine unit is disposed. Since the steam valve generally weighs several hundred or thousand kilograms, the steam valve is moved using a crane during the assembly or disassembly of the steam turbine.

SUMMARY OF THE INVENTION

Therefore, the present invention has been made in view of the related art, and it is an object of the present invention to provide a steam turbine configured such that components constituting a steam valve are prevented from being damaged during the assembly or disassembly of the steam turbine and to provide a method of assembling and disassembling the configured steam turbine.

In accordance with an aspect of the present invention, the above and other objects can be accomplished by the provision of a steam turbine comprising a turbine main body supplied with steam from a steam supply unit and a steam valve for controlling an amount of steam to be supplied from the steam supply unit to the turbine main body, wherein the turbine main body comprises a first connection unit; and a plurality of guide rods extending from the first connection unit in a first direction, and wherein the steam valve comprises a second connection unit configured to be coupled to the first connection unit; and a flange disposed around the second connection unit and configured to receive the guide rods through a plurality of first through-holes respectively formed in the flange. Here, the first connection unit may include an inner circumference and an end surface provided around the inner circumference.

The guide rods may be arranged symmetrically around the inner circumference of the first connection unit, and may be fixedly coupled to the end surface of the first connection unit. Each of the guide rods may include a distal end formed to have a tapered surface, and may be formed to have a cylindrical shape and a flat side surface.

The flange may be further configured to receive a plurality of screw jacks through a plurality of third through-holes respectively formed in the flange adjacent to the first through-holes.

The turbine main body may further comprise a plurality of threaded rods extending in the first direction, and may be fixedly coupled to the first connection unit adjacent to the guide rods.

The flange may be further configured to receive the threaded rods through a plurality of second through-holes respectively formed in the flange adjacent to the first through-holes. Each of the threaded rods may have an outer diameter smaller than an inner diameter of a corresponding one of the second through-holes.

The turbine main body may further comprise a plurality of nuts respectively fitted onto the threaded rods for moving the steam valve toward the turbine main body.

In accordance with another aspect of the present invention, there is provided a method of assembling a steam turbine. The method includes steps of preparing a turbine main body comprising a turbine unit configured to be rotated by a supply of steam, a first connection unit configured to receive the supply of steam, a plurality of guide rods extending from the first connection unit in a first direction, and a plurality of threaded rods disposed so as to be adjacent to the guide rods, the threaded rods extending in the first direction; preparing a steam valve configured to control an amount of steam to be supplied into the turbine main body, the steam valve comprising a second connection unit disposed so as to face the first connection unit, and a flange disposed around the second connection unit and configured to receive the guide rods through a plurality of first through-holes respectively formed in the flange and to receive the threaded rods through a plurality of second through-holes respectively formed in the flange adjacent to the first through-holes; moving the steam valve toward the turbine main body in opposition to the first direction such that a distal end of each of the guide rods is inserted into a corresponding one of the first through-holes; further moving the steam valve toward the turbine main body after the guide rod insertion, such that a nut-receiving end of each of the threaded rods is inserted through a corresponding one of the second through-holes; fitting each of a plurality of nuts onto the nut-receiving end of a corresponding one of the threaded rods, after the threaded rod insertion; and rotating the nuts such that the first connection unit and the second connection unit come into tight contact with each other.

The step of rotating the nuts may include simultaneously moving the nuts toward the turbine main body, and the step of simultaneously moving the nuts may include moving each of the nuts an equal distance in opposition to the first direction.

In accordance with a further aspect of the present invention, there is provided a method of disassembling a steam turbine. The method includes steps of preparing a turbine main body and a steam valve configured to control an amount of steam to be supplied into the turbine main body, wherein the turbine main body may include a turbine unit configured to be rotated by a supply of steam, a first connection unit configured to receive the supply of steam, a plurality of guide rods extending from the first connection unit in a first direction, and a plurality of threaded rods disposed so as to be adjacent to the guide rods, the threaded rods extending in the first direction, and wherein the steam valve may include a second connection unit disposed in a state of being in tight contact with the first connection unit, and a flange disposed around the second connection unit and configured to receive the guide rods through a plurality of first through-holes respectively formed in the flange, to receive the threaded rods through a plurality of second through-holes respectively formed in the flange adjacent to the first through-holes, and to receive a plurality of screw jacks through a plurality of third through-holes respectively formed in the flange adjacent to the first through-holes. In addition, the method may include steps of inserting each of the screw jacks into a corresponding one of the third through-holes, from the steam valve toward the turbine main body in opposition to the first direction; and actuating the screw jacks such that the steam valve is separated from the turbine main body in the first direction. The screw jacks may be applied around the flange in a symmetrical fashion corresponding to the arrangement of the guide rods.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Since embodiments of the present invention can be variously modified in many different forms, reference will now be made in detail to specific embodiments of the present invention. It is to be understood that the present description is not intended to limit the present invention to those specific embodiments and that the present invention is intended to cover not only the specific embodiments but also various alternatives, modifications, equivalents and other embodiments that may be included within the spirit and scope of the present invention as defined by the appended claims.

The terminology used herein is for the purpose of describing particular embodiments only and is not intended to be limiting. As used herein, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof, but do not preclude the presence or addition of one or more other features, integers, steps, operations, elements, components, and/or combinations thereof. Hereinafter, a steam turbine according to an embodiment of the present invention will be described with reference to the accompanying drawings.

Before describing the steam turbine according to this embodiment, a power facility including the steam turbine according to this embodiment will be described. The power facility including the steam turbine according to this embodiment is used in a steam power plant or a nuclear power plant. The power facility may operate a generator using steam that is generated by thermal energy obtained through the combustion of coal, petroleum, or natural gas or through atomic fission in order to produce electric power.

Hereinafter, a power facility that is applied to a nuclear power plant will be described with reference to FIG. 1. However, the power facility including the steam turbine according to this embodiment may also be applicable to a steam power plant, in addition to the nuclear power plant.

Figure 1:
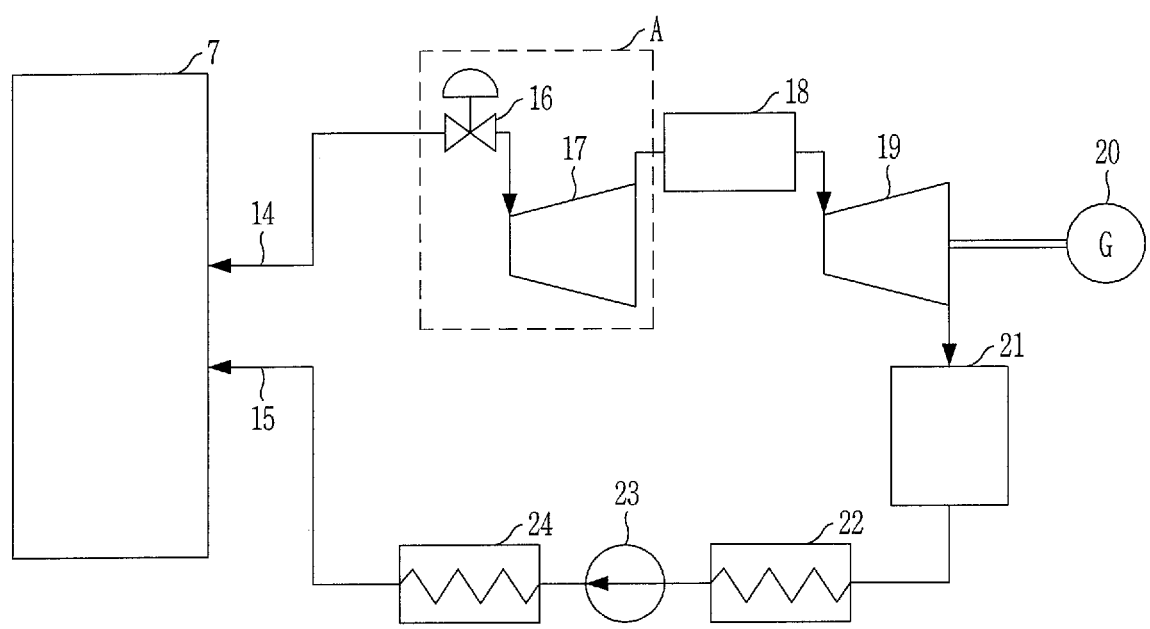
FIG. 1 is a view schematically showing a power facility including a steam turbine according to an embodiment of the present invention.

FIG. 1 schematically shows a power facility including a steam turbine according to an embodiment of the present invention.

Referring to FIG. 1, the power facility may include a nuclear reactor 7, a steam valve 16, steam turbines 17 and 19, a moisture separator and reheater 18, a generator (G) 20, a condenser 21, water heaters 22 and 24, and a water supply pump 23.

The nuclear reactor 7 controls a chain reaction of atomic fission in order to generate steam using thermal energy generated during atomic fission. The nuclear reactor 7 may include a plurality of fuel rods, a control rod, and a cooler.

A main steam pipe 14 may be connected to the nuclear reactor 7 in order to supply steam that is generated by the nuclear reactor 7 to the high-pressure turbine 17. The steam supplied to the main steam pipe 14 may be supplied to the high-pressure turbine 17 via the steam valve 16, which is disposed in the main steam pipe 14. The steam valve 16 may control the amount of steam to be supplied to the high-pressure turbine 17.

The steam supplied to the high-pressure turbine 17 is supplied to the low-pressure turbine 19 via the moisture separator and reheater 18. The low-pressure turbine 19 may be connected to the generator 20.

The condenser 21, which condenses steam discharged from the low-pressure turbine 19, may be installed at the outlet of the low-pressure turbine 19. The low-pressure water heater 22, the water supply pump 23, and the high-pressure water heater 24 may be installed downstream of the condenser 21.

A water supply pipe 15 may be connected to the downstream side of the condenser 21 and extends from the condenser 21 to the nuclear reactor 7. The low-pressure water heater 22, which heats the water supplied from the condenser 21, the water supply pump 23, which pressurizes the water to be supplied to the nuclear reactor 7, and the high-pressure water heater 24, which heats the water to be supplied to the nuclear reactor 7, may be arranged in that order along the water supply pipe 15.

Hereinafter, the steam turbine, which is used in the power facility, will be described with reference to FIGS. 2 and 3.

Figure 2:
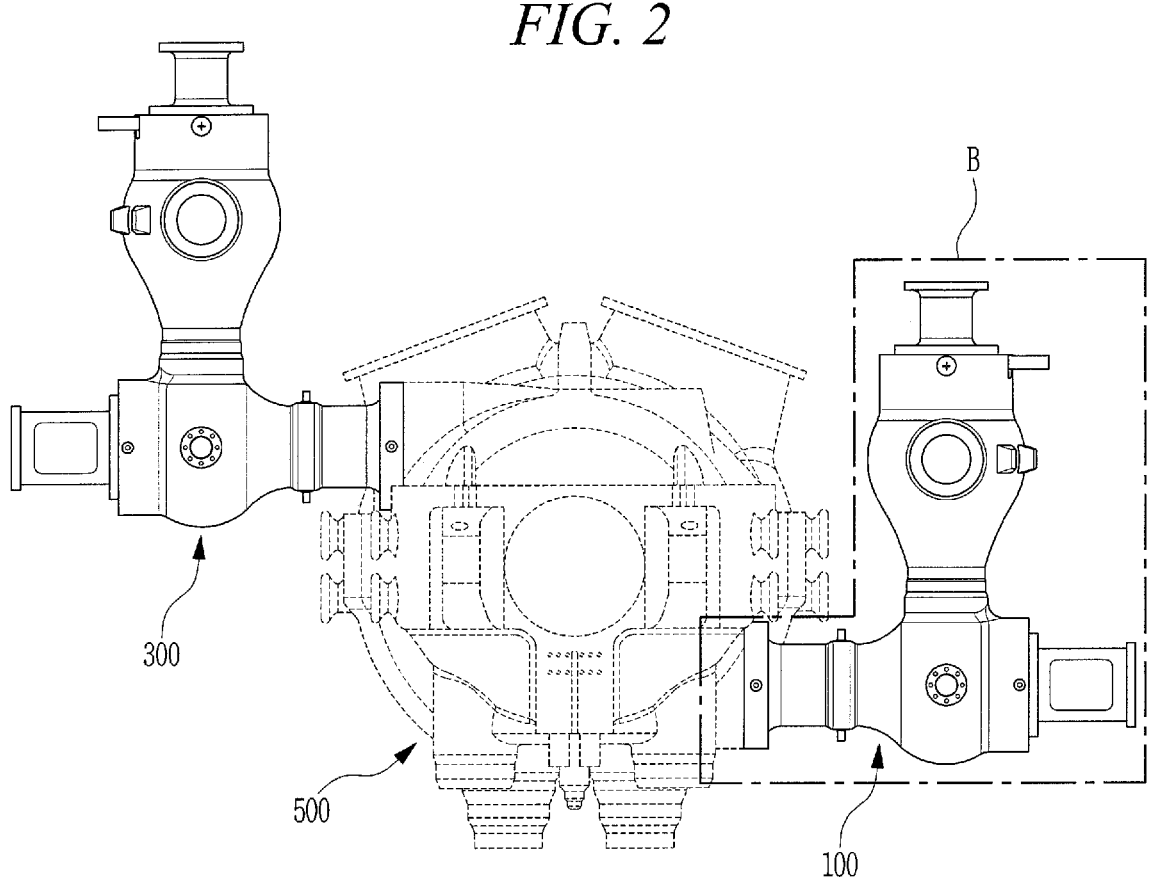
FIG. 2 is a view schematically showing a turbine main body and a steam valve, shown in region A of FIG. 1.

FIG. 2 illustrates a turbine main body and a steam valve, shown in region A of FIG. 1. FIG. 3 shows the state in which connection units corresponding to the turbine main body and steam valve, shown in region B of FIG. 2, are coupled to each other.

Figure 3:
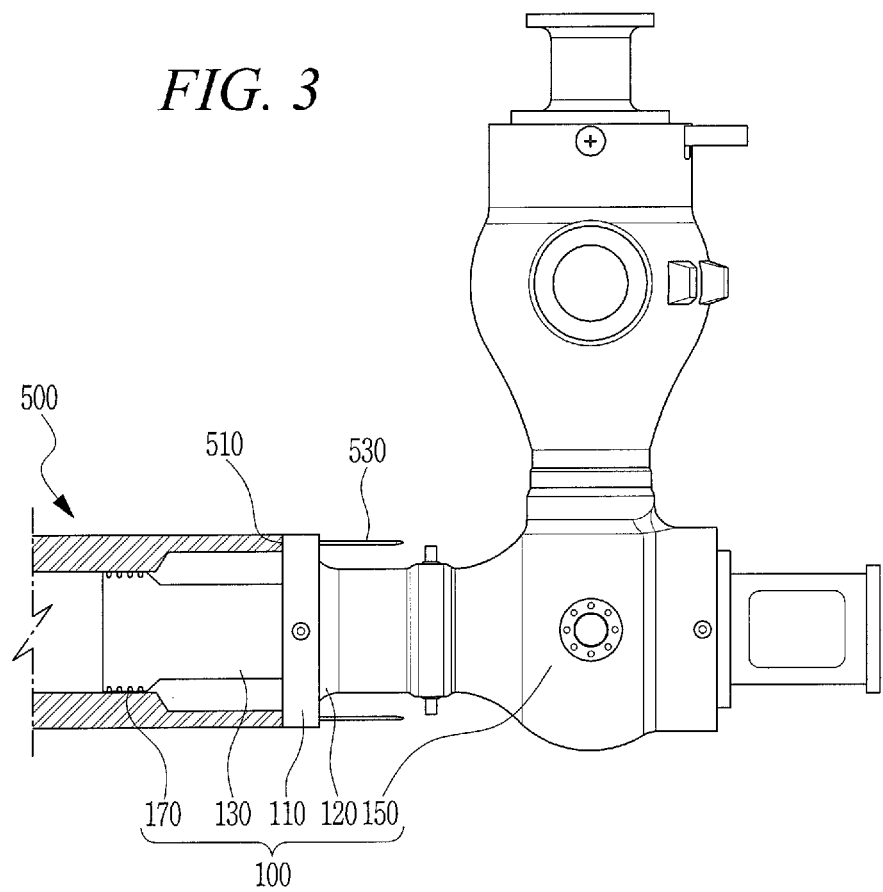
FIG. 3 is a view showing the state in which a first connection unit and a second connection unit, shown in region B of FIG. 2, are coupled to each other.

Referring to FIGS. 2 and 3, a steam turbine according to an embodiment of the present invention may include a turbine main body 500 and a steam valve 100 configured to control the amount of steam to be supplied to the turbine main body 500. A steam supply unit (not shown) supplies steam to the turbine main body 500, and the supplied steam rotates a turbine unit of the turbine main body 500.

The steam supply unit may be the nuclear reactor 7 shown in FIG. 1. That is, though the present invention is not limited to application of the nuclear reactor 7, the steam supplied to the turbine main body 500 may be steam generated by thermal energy obtained through atomic fission. Alternatively, the steam supply unit may be a boiler in a steam power plant, such that steam supplied to the turbine main body 500 is generated by thermal energy obtained through combustion of fossil fuels such as coal, petroleum, or natural gas.

The turbine main body 500 is a device that rotates a turbine unit using the steam supplied from the steam supply unit in order to generate rotary motion. Meanwhile, the generator 20 shown in FIG. 1 may be rotated to generate electricity and is connected to the turbine main body 500. That is, the turbine main body 500 shown in FIGS. 2 and 3 may be the steam turbines 17 and 19 shown in FIG. 1. Thus, referring to FIG. 2, steam valves 100 and 300 are respectively disposed between the turbine main body 500 and the steam supply unit.

The steam valves 100 and 300 may be employed to control the amount of steam to be supplied from the steam supply unit to the turbine main body 500. Specifically, a steam valve 100 or 300 may be fixedly coupled to one side of the turbine main body 500. In FIG. 2, two steam valves 100 and 300 are shown as being coupled to the turbine main body 500, but the present invention is not limited to this configuration, and one or more steam valves may be employed and respectively coupled to the turbine main body 500. That is, the present embodiment is applicable to a single steam valve, or to plural steam valves individually.

Referring to FIG. 3, when the steam valve 100 is coupled to the turbine main body 500, a first connection unit 510 of the turbine main body 500 and a second connection unit 120 of the steam valve 100 are brought into tight contact with each other. More specifically, a piston 130, which is connected to the second connection unit 120, comes into tight contact with an inner wall of the first connection unit 510 of the turbine main body 500. A piston ring 170 may be disposed at an outer circumferential surface of the piston 130 in order to prevent the leakage of steam. That is, the piston ring 170 may be interposed between the inner wall of the first connection unit 510 and the outer circumferential surface of the piston 130 in order to prevent the leakage (discharge) of steam being supplied to the turbine main body 500.

When the steam valve 100 is coupled to the turbine main body 500 in the course of assembling or reassembling a steam turbine, a crane is used to move the steam valve 100, which weighs several hundreds or thousands of kilograms, toward the turbine main body 500 in a substantially horizontal direction. When the piston 130 of the steam valve 100 is inserted into the first connection unit 510 of the turbine main body 500, the piston ring 170 may collide with the inner wall of the first connection unit 510, whereby the piston ring 170 may be damaged. That is, the piston ring 170 may be damaged when the steam valve 100 is horizontally moved toward the turbine main body 500 while the turbine main body 500 and the steam valve 100 are misaligned or otherwise imperfectly aligned with each other.

According to this embodiment, during the assembly of the steam turbine, a plurality of guide rods 530 provided to the turbine main body 500 may be inserted into first through-holes 143 (see FIG. 10) formed in a flange 110 of the steam valve 100 in order to correctly align the turbine main body 500 and the steam valve 100 with each other. Specifically, as a valve main body 150 is moved horizontally using a crane, the guide rods 530 of the turbine main body 500, which are inserted into the first through-holes 143 formed in the flange 110, may serve to guide the movement of the valve main body 150. When the piston 130 is to be inserted into the inner wall of the first connection unit 510, therefore, damage to the piston ring 170 may be prevented.

Meanwhile, according to this embodiment, a plurality of threaded rods 550 (see FIG. 4) may be arranged in the vicinity of the guide rods 530 of the turbine main body 500. The threaded rods 550 may, together with the guide rods 530, serve to prevent the piston ring 170 from being damaged during the assembly of the steam turbine. The guide rods 530 and the threaded rods 550 will be described below in detail.

Hereinafter, a method of assembling a steam turbine according to an embodiment of the present invention will be described with reference to FIGS. 4 to 7. Preliminary to describing the method of assembling the steam turbine according to this embodiment, the structure of the steam turbine of the present invention will be described in more detail.

Referring to FIGS. 4 to 7, the turbine main body 500 is a device that rotates a turbine unit disposed therein using the steam supplied from the steam supply unit in order to generate rotary motion. The turbine main body 500 may include a first connection unit 510, a plurality of guide rods 530, and a plurality of threaded rods 550.

The first connection unit 510 comes into tight contact with the second connection unit 120 of the steam valve 100 when the assembly of the steam turbine is completed by fastening the first connection unit 510 and the second connection unit 120 to each other. The first connection unit 510 may introduce the steam supplied from the steam supply unit into the turbine main body 500.

According to this embodiment, the guide rods 530 may be arranged along the circumference of the first connection unit 510. The guide rods 530 may extend in a first direction. Here, the first direction means a direction that faces the second connection unit 120 from the first connection unit 510, which is opposite the second connection unit 120, in FIG. 4. That is, the guide rods 530 may extend from the first connection unit 510 toward the second connection unit 120, when the first and second connection units are positioned for assembly.

The first connection unit 510 includes an inner circumference and an end surface 511 provided around the inner circumference, so that the guide rods 530 may be fixedly coupled to the end surface 511 of the first connection unit 510. Similarly, the plurality of threaded rods 550 extend in the first direction, from the end surface 511, and may be fixedly coupled to the first connection unit 510 adjacent to the guide rods 530.

When the steam valve 100 is coupled to the turbine main body 500, the guide rods 530 may serve to guide the second connection unit 120 of the steam valve 100 such that the second connection unit 120 of the steam valve 100 can be correctly coupled to the first connection unit 510 of the turbine main body 500. When the second connection unit 120 is moved toward the first connection unit 510 by the crane (not shown), the guide rods 530 are inserted into the first through-holes 143 (see FIG. 10) formed in the flange 110 of the second connection unit 120, whereby the second connection unit 120 is moved along a predetermined route and is then coupled to the first connection unit 510. When the piston ring 170 of the steam valve 100 is inserted into the inner wall of the first connection unit 510, therefore, the piston ring 170 may be prevented from being damaged.

The guide rods 530 may be arranged symmetrically along the circumference of the first connection unit 510. That is, the guide rods 530 are arranged symmetrically around the inner circumference of the first connection unit 510. For example, in the case in which four guide rods 530 are arranged along the circumference of the first connection unit 510, a guide rod 535 may be disposed at the circumference of the first connection unit 510 in the direction of 1 o'clock, a guide rod (not shown) may be disposed at the circumference of the first connection unit 510 in the direction of 4 o'clock, a guide rod 531 may be disposed at the circumference of the first connection unit 510 in the direction of 7 o'clock, and a guide rod 533 may be disposed at the circumference of the first connection unit 510 in the direction of 10 o'clock. Here, when the first connection unit 510 of the turbine main body 500 is viewed from the steam valve 100, the peak is defined as 12 o'clock, and the nadir is defined as 6 o'clock.

Each of the guide rods 530 may be formed to have a cylindrical shape. In particular, the basic shape of each of the guide rods is a right circular cylinder, such that the side surface of each of the guide rods 530 may form a straight line. That is, the outer circumferential surface of each of the guide rods 530 may be flat over its full length. Consequently, each of the guide rods 530 may be easily pass through a corresponding one of the first through-holes 143 (see FIG. 10) formed in the flange 110. The flange 110 may be integrally formed with the second connection unit 120 to be disposed around the second connection unit 120 so as to face the end surface 511 of the first connection unit 510.

Figure 4:
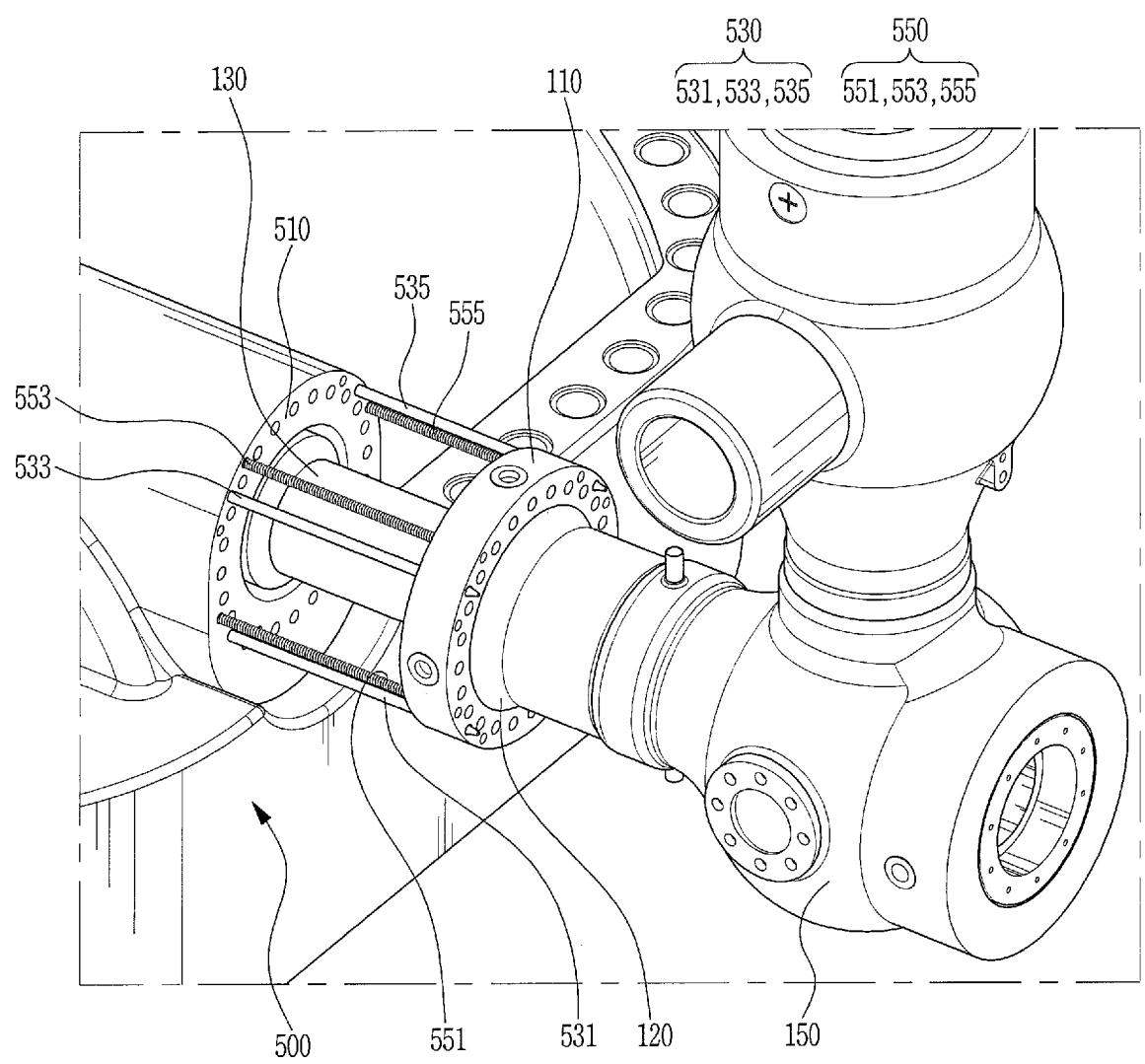
FIGS. 4 to 7 are views sequentially showing a method of assembling the steam turbine according to an embodiment of the present invention.

In addition, a distal end of each of the guide rods 530 may be formed to have a tapered surface, such that the sectional area of each distal end gradually decreases from the turbine main body 500 toward the steam valve 100. For example, the distal end of each of the guide rods 530 may be formed to have a cone shape including a pointed tip. As shown in FIG. 4, therefore, each of the guide rods 530 may be easily inserted into a corresponding one of the first through-holes 143 (see FIG. 10) formed in the flange 110.

Meanwhile, according to this embodiment, the threaded rods 550 may be arranged along the circumference of the first connection unit 510. The threaded rods 550 may be fixedly coupled to the first connection unit 510. That is, the threaded rods 550 are fixed so as not to be rotated or moved when the turbine main body 500 and the steam valve 100 are assembled.

The threaded rods 550 may be arranged so as to be adjacent to the guide rods 530. For example, a threaded rod 551 may be disposed so as to be adjacent to the guide rod 531, a threaded rod 553 may be disposed so as to be adjacent to the guide rod 533, and a threaded rod 555 may be disposed so as to be adjacent to the guide rod 535. The threaded rods 550 may extend in the first direction in the same manner as the guide rods 530.

Each of the threaded rods 550 may be formed to have a cylindrical shape. A screw thread may be formed in the outer circumferential surface of each of the threaded rods 550. When the turbine main body 500 and the steam valve 100 are assembled, the threaded rods 550 are inserted through second through-holes 141 (see FIG. 10) formed in the flange 110. The inner diameter of each of the second through-holes 141 (see FIG. 10) may be greater than the outer diameter of a corresponding one of the threaded rods 550. When the threaded rods 550 are inserted through the second through-holes 141 (see FIG. 10), uneven friction between the outer circumferential surface of each of the threaded rods 550 and the inner circumferential surface of a corresponding one of the second through-holes 141 (see FIG. 10) is prevented.

Nuts 560 may be fitted onto the threaded rods 550. A nut 561 may be fitted onto the threaded rod 551, a nut 563 may be fitted onto the threaded rod 553, and a nut 565 may be fitted onto the threaded rod 555.

The flange 110 may be moved toward the first connection unit 510 by rotating the nuts 560. According to this embodiment, the second connection unit 120 may be correctly moved toward the first connection unit 510 by simultaneously and equally rotating the nuts 560 fitted onto the threaded rods 550. The movement of the first connection unit 510 toward the second connection unit 120, and in turn the steam valve 100 toward the turbine main body 500, follows a path in opposition to the first direction of the extending of the guide rods 530 and threaded rods 550. At this time, each of the nuts 560 may be moved an equal distance toward the first connection unit 510 by simultaneously and equally rotating the nuts 560. After the nuts 560 are rotated to draw the steam valve 100 tightly against the turbine main body 500, the first connection unit and the second connection unit are fastened to each other using separate coupling means (not shown).

The process of assembling the steam turbine according to this embodiment will now be described with reference to FIGS. 4 to 7.

Referring to FIG. 4, the steam valve 100 is moved first toward the turbine main body 500 such that each of the guide rods 530 can be inserted into a corresponding one of the first through-holes 143 (see FIG. 10) formed in the flange 110 of the steam valve 100. At this time, each of the guide rods 530 can be easily inserted into a corresponding one of the first through-holes 143 (see FIG. 10), since the distal end of each of the guide rods 530 is tapered.

Figure 5:
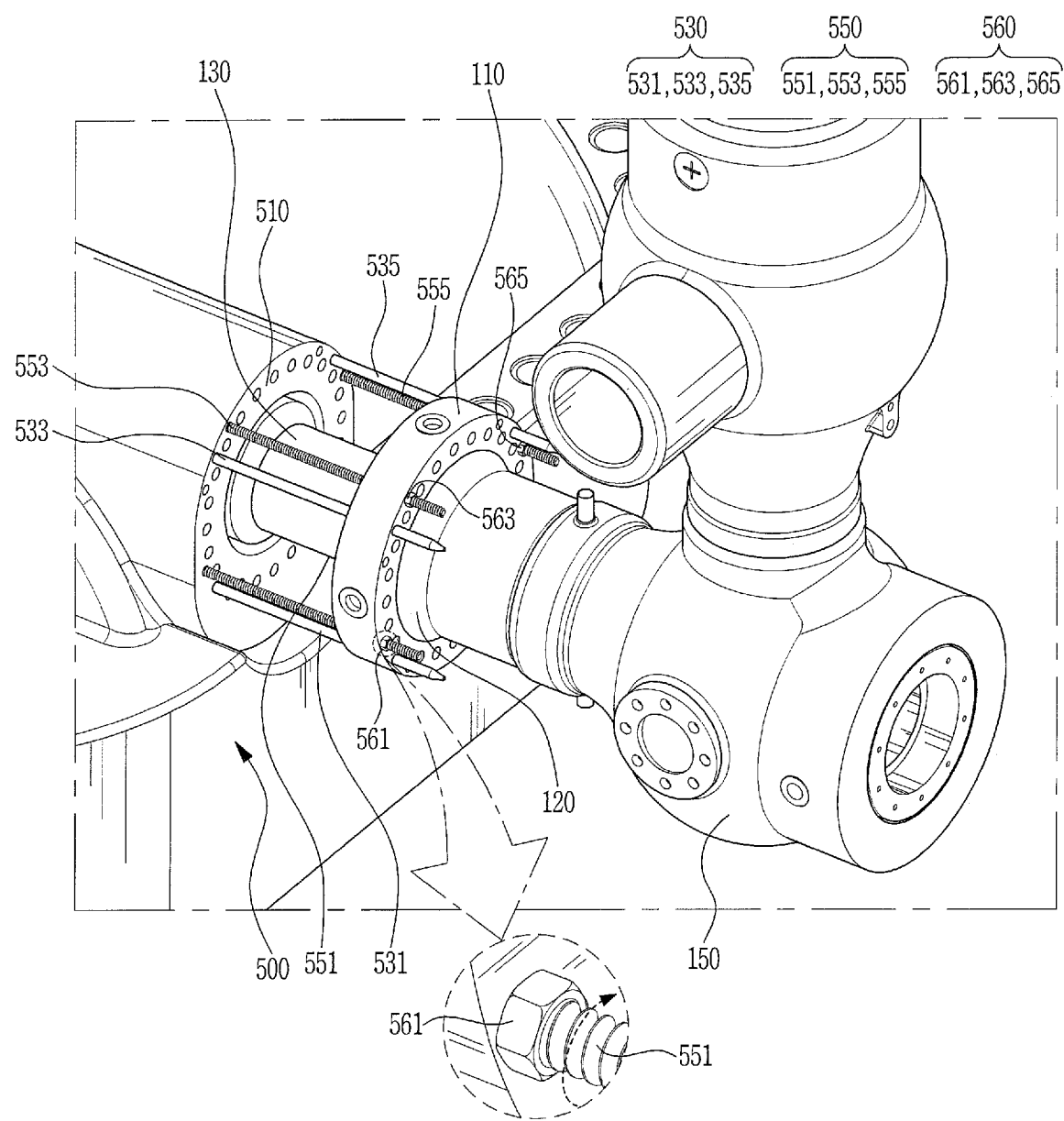

As shown in FIG. 5, the steam valve 100 is further moved toward the turbine main body 500 such that each of the threaded rods 550 can be inserted through a corresponding one of the second through-holes 141 (see FIG. 10) formed in the flange 110. Subsequently, the nuts 560 are fitted onto nut-receiving ends of the threaded rods 550 after the threaded rods 550 have been sufficiently inserted through the second through-holes 141 (see FIG. 10) to expose one or more of the nut-receiving ends.

Figure 6:
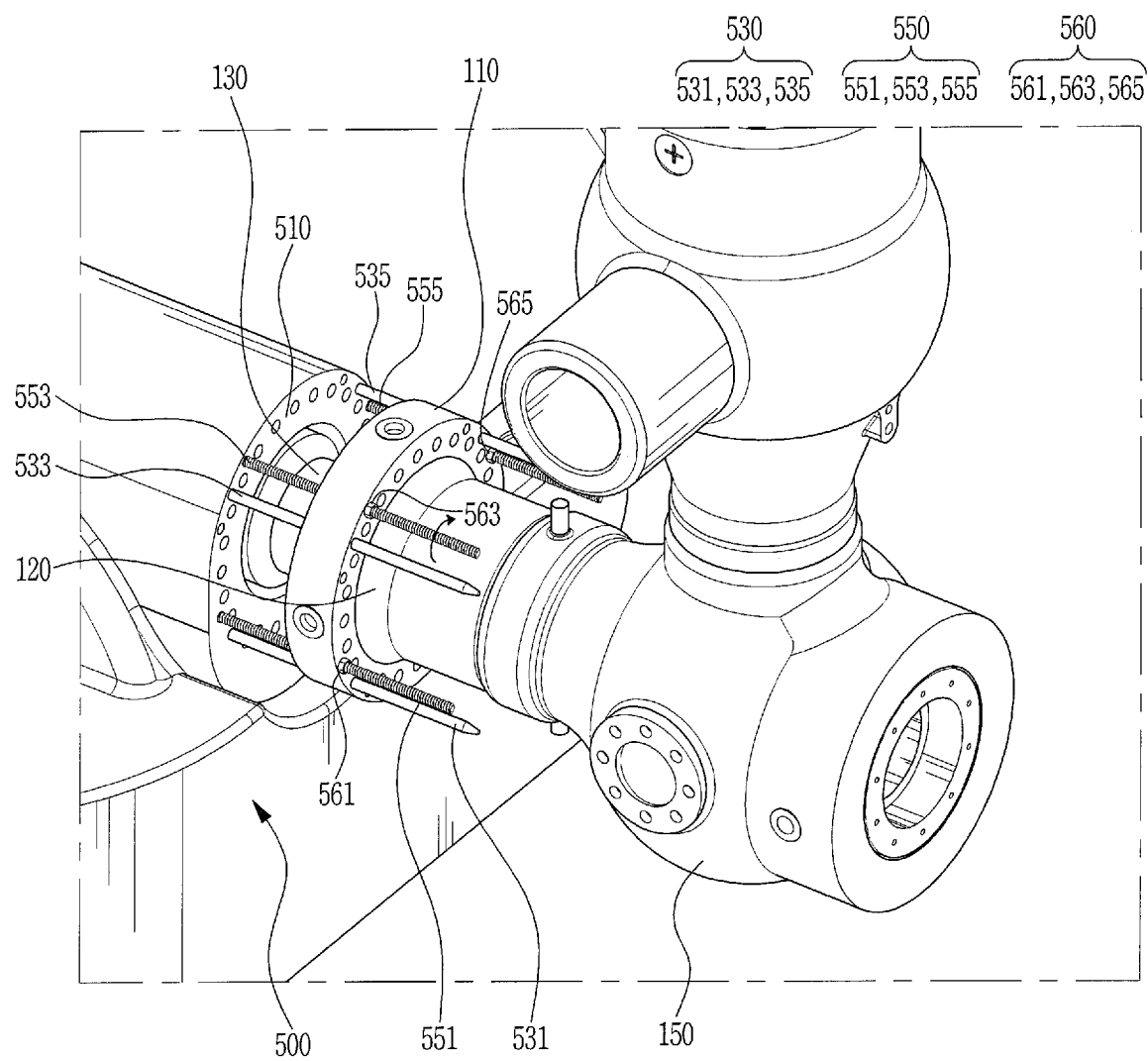
Figure 7:
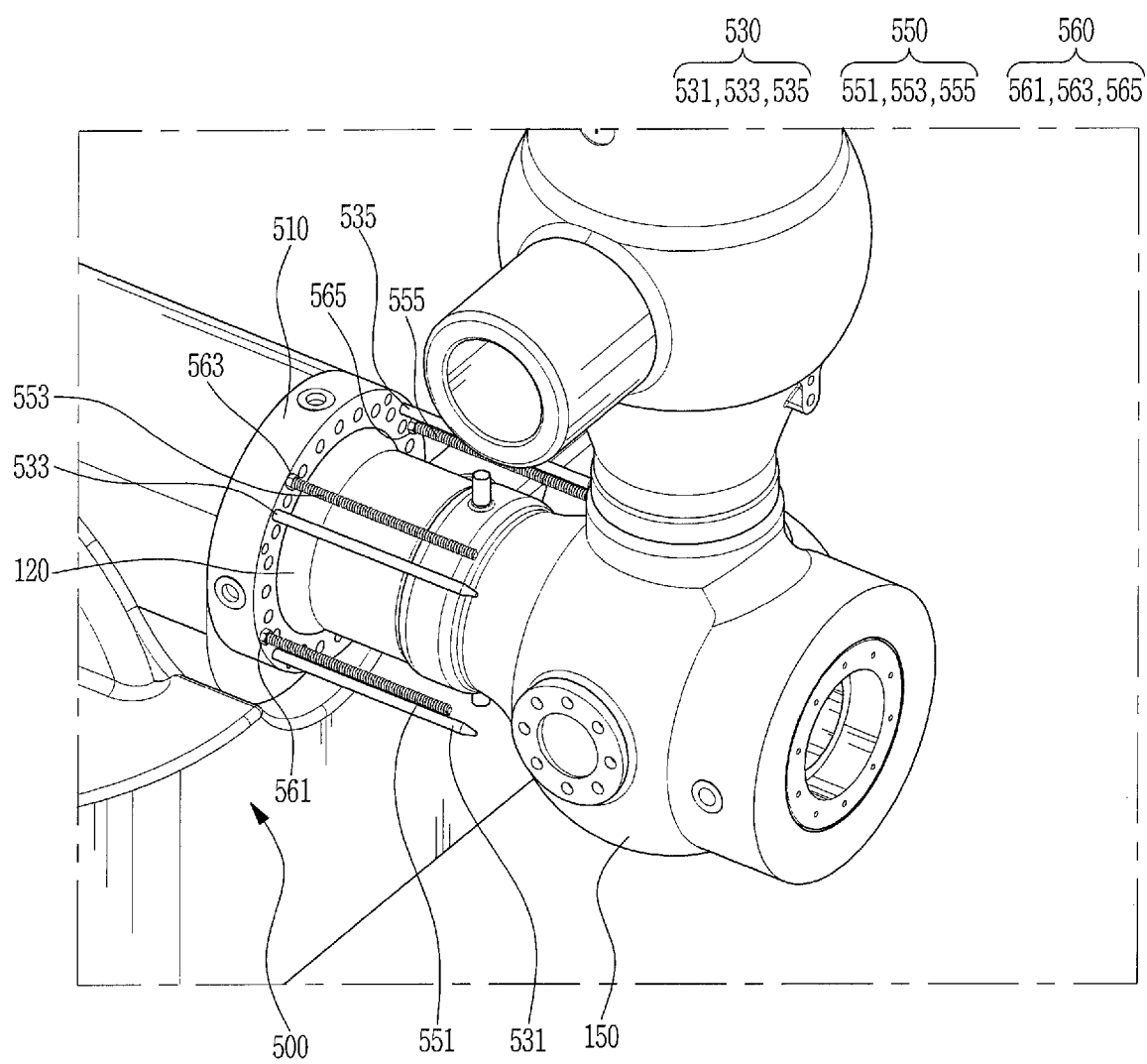

Subsequently, the nuts 560 fitted onto the threaded rods 550 are rotated simultaneously and equally such that the nuts 560 are moved toward the turbine main body 500, as shown in FIGS. 6 and 7. As a result, the steam valve 100 may be moved toward the turbine main body 500. The steam valve 100 can be correctly moved toward the turbine main body 500 along the guide rods 530 by simultaneously and equally rotating the nuts 560 fitted onto the threaded rods 550. Because the steam valve 100 is moved correctly, the piston 130 of the steam valve 100 may be moved without uneven friction between the piston 130 of the steam valve 100 and the inner wall of the first connection unit 510.

Figure 8:
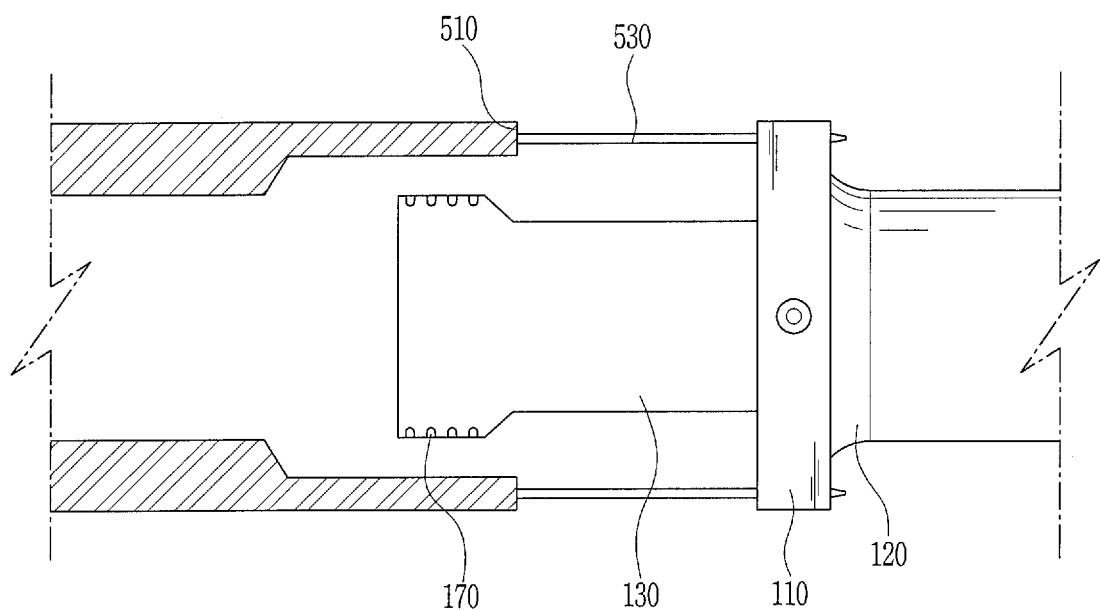
FIGS. 8 and 9 are views illustrating a process in which a piston of the steam valve is disposed in the turbine main body.
Figure 9:
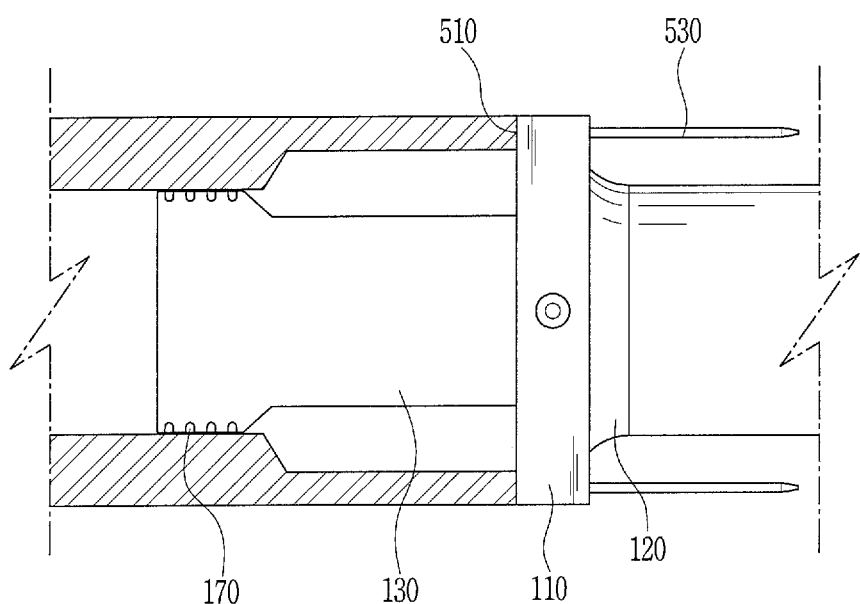

That is, in the method of assembling the steam turbine according to this embodiment, the piston 130 is moved correctly when the steam valve 100 is moved to the turbine main body 500 during the assembly of the steam turbine, as shown in FIGS. 8 and 9. As a result, it is possible to prevent the piston ring 170 from being damaged due to uneven friction between the piston ring 170 and the inner wall of the first connection unit 510.

Figure 10:
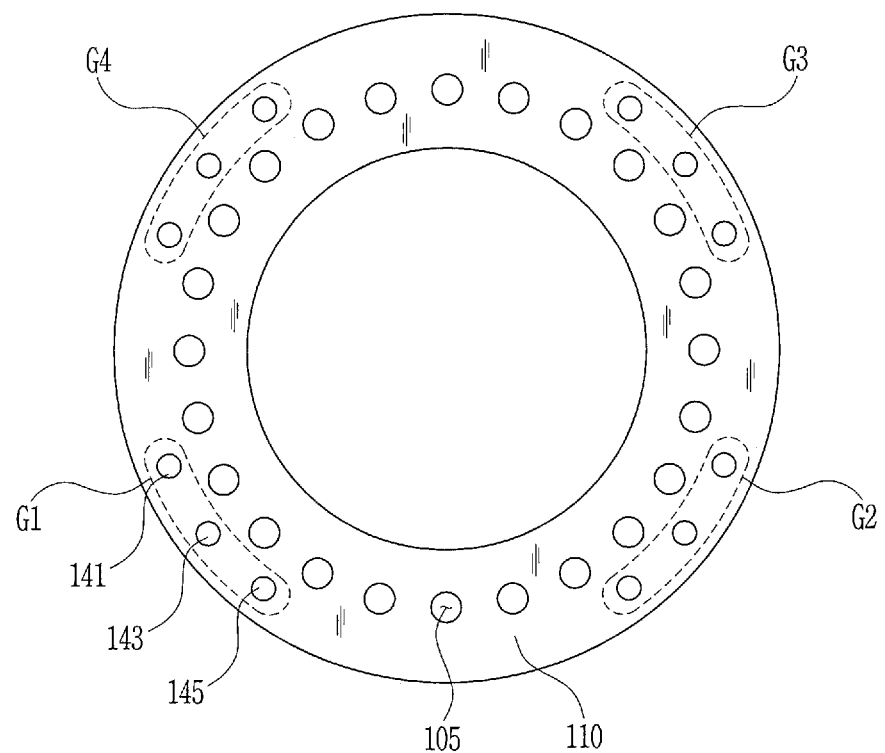
FIG. 10 is a view schematically showing a flange of the steam valve.

Meanwhile, referring to FIG. 10, the first through-holes 143 and the second through-holes 141 may be formed in the flange 110. As described above, the guide rods 530 may be inserted through the first through-holes 143 formed in the flange 110, and the threaded rods 550 may be inserted through the second through-holes 141 formed in the flange 110. The second through-holes 141 may be formed so as to be adjacent to the first through-holes 143 based on the positional relationship between the guide rods 530 and the threaded rods 550.

In addition, the first through-holes 143 and the second through-holes 141 may be formed in the flange 110 in a symmetrical fashion. For example, one of the first through-holes 143 and one of the second through-holes 141 may be disposed in a region G1, and another of the first through-holes 143 and another of the second through-holes 141 may be disposed in another region G2.

In addition, yet another of the first through-holes 143 and yet another of the second through-holes 141 may be disposed in yet another region G3, and still yet another of the first through-holes 143 and still yet another of the second through-holes 141 may be disposed in still yet another region G4. At this time, the regions G1, G2, G3, and G4 may be disposed in a symmetrical fashion, as shown in FIG. 10.

Meanwhile, a third through-hole 145 may be formed in each of the regions G1, G2, G3, and G4 so as to be adjacent to a corresponding one of the first through-holes 143 and a corresponding one of the second through-holes 141. A plurality of screw jacks 570 (see FIG. 11) may be inserted through the third through-holes 145, a description of which will follow. The screw jacks 570 may be used to separate the steam valve 100 from the turbine main body 500. The screw jacks 570 will be described below in detail.

Hereinafter, a method of disassembling a steam turbine according to an embodiment of the present invention will be described with reference to the sequential views of FIGS. 11 to 14.

Figure 11:
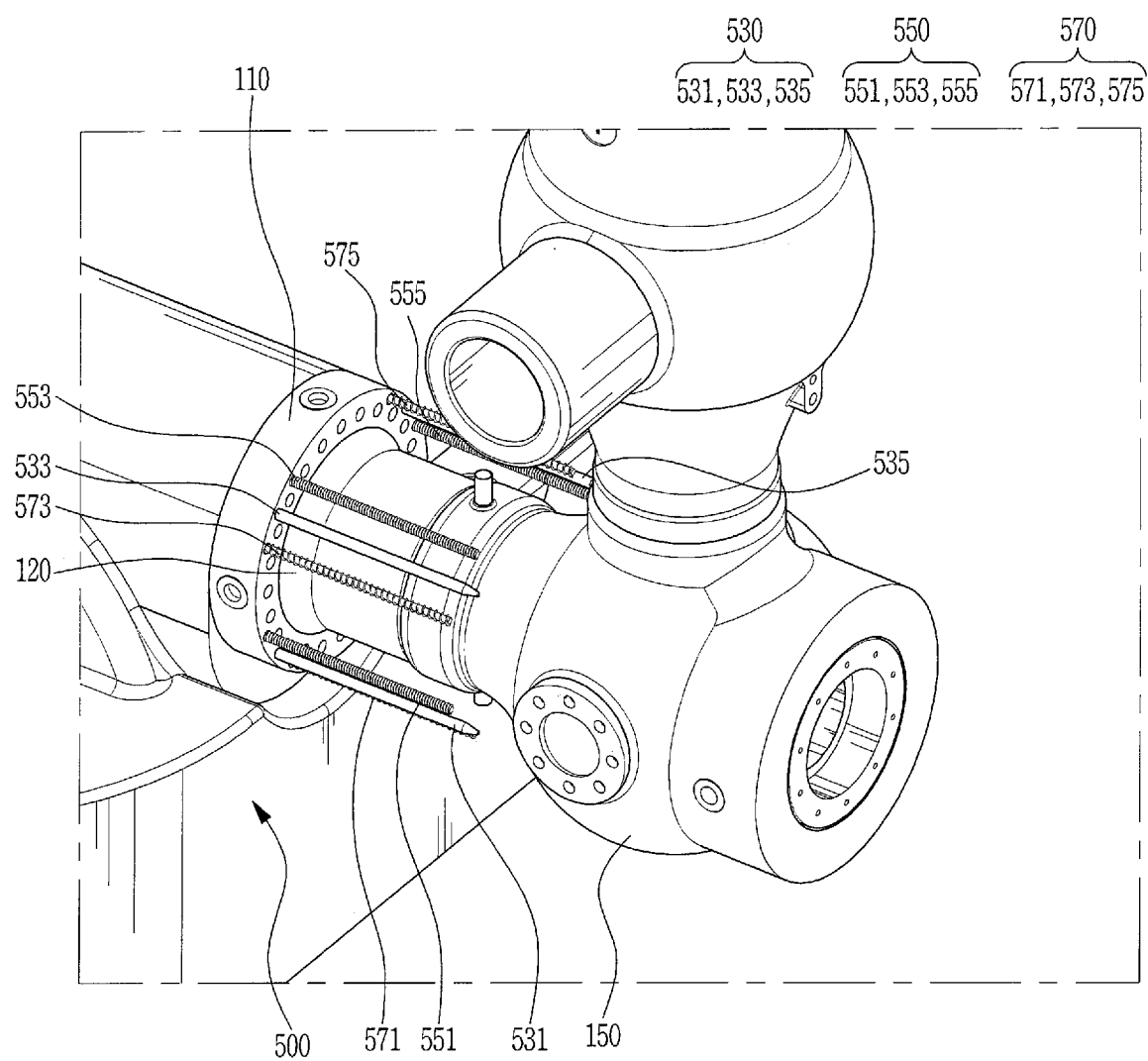
FIGS. 11 to 14 are views sequentially showing a method of disassembling the steam turbine according to an embodiment of the present invention.

When it is necessary to maintain and repair the steam turbine, the steam valve 100 is separated from the turbine main body 500 in order to disassemble the steam turbine. First, as shown in FIG. 11, each of the screw jacks 570 is inserted into a corresponding one of the third through-holes 145 (see FIG. 10) formed in the flange 110. Each of the screw jacks 570 is a bar-shaped member having a screw thread formed in the outer circumferential surface thereof. Each of the screw jacks 570 may be a well-known device that is capable of moving an object through rotary motion thereof. According to this embodiment, each of the third through-holes 145 (see FIG. 10) formed in the flange 110 is provided in the inner circumferential surface thereof with a screw thread, which is engaged with the screw thread formed in a corresponding one of the screw jacks 570. Thus, the screw jacks 570 are applied around the flange 110 in a symmetrical fashion corresponding to the arrangement of the guide rods 530 or the threaded rods 550, and are actuated such that the steam valve 100 is separated from the turbine main body 500 in the first direction.

Figure 12:
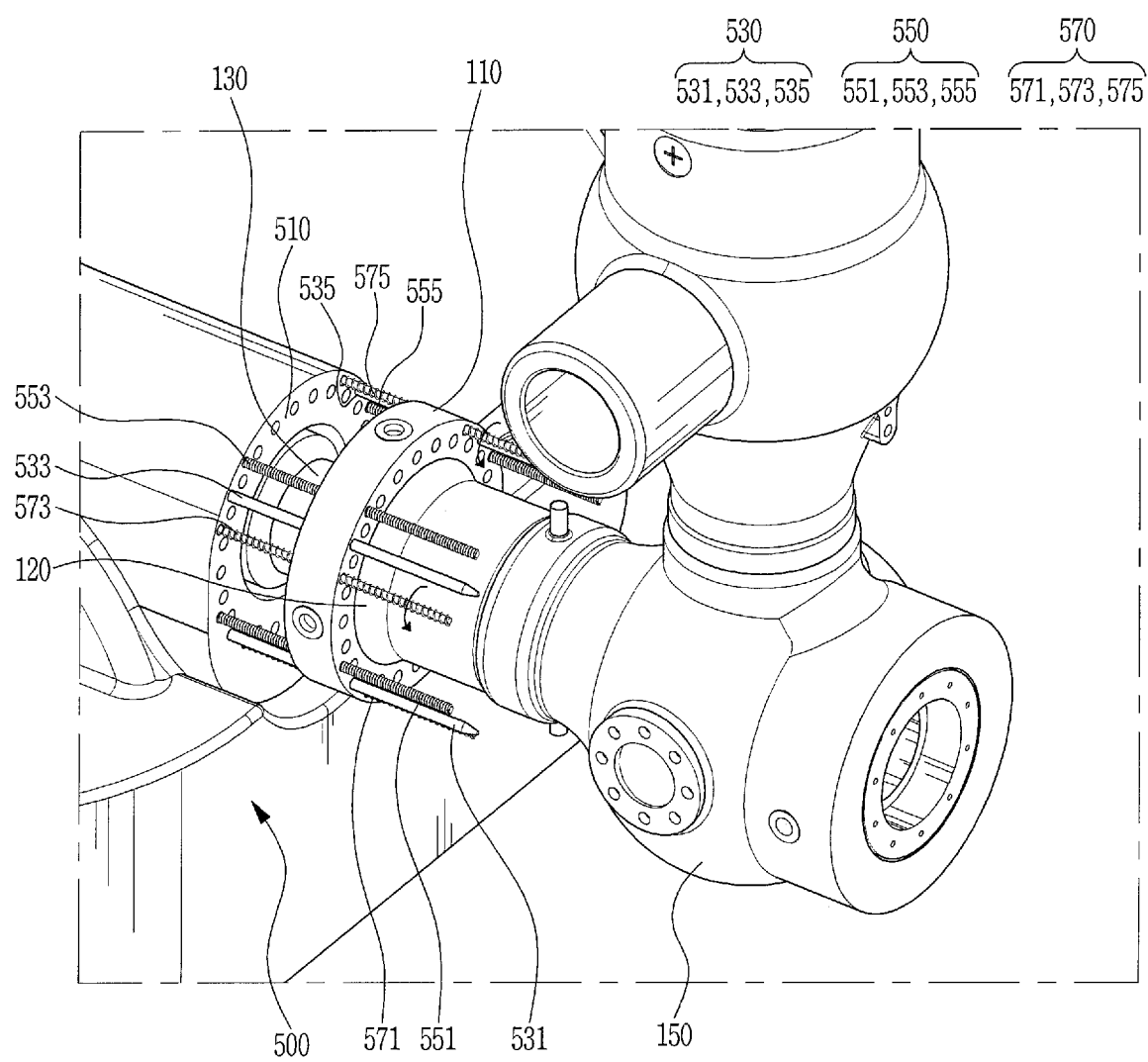
Figure 13:
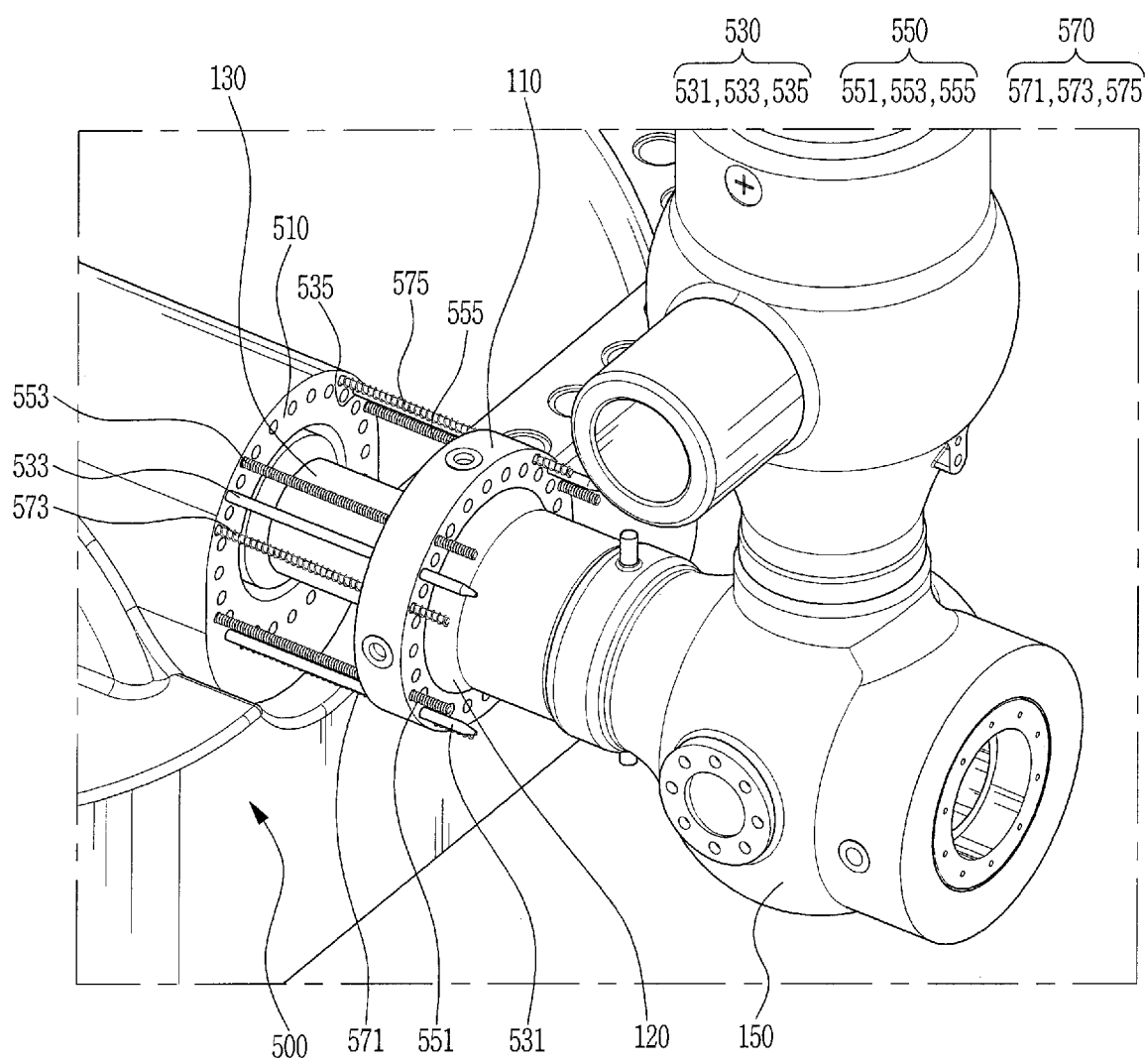
Figure 14:
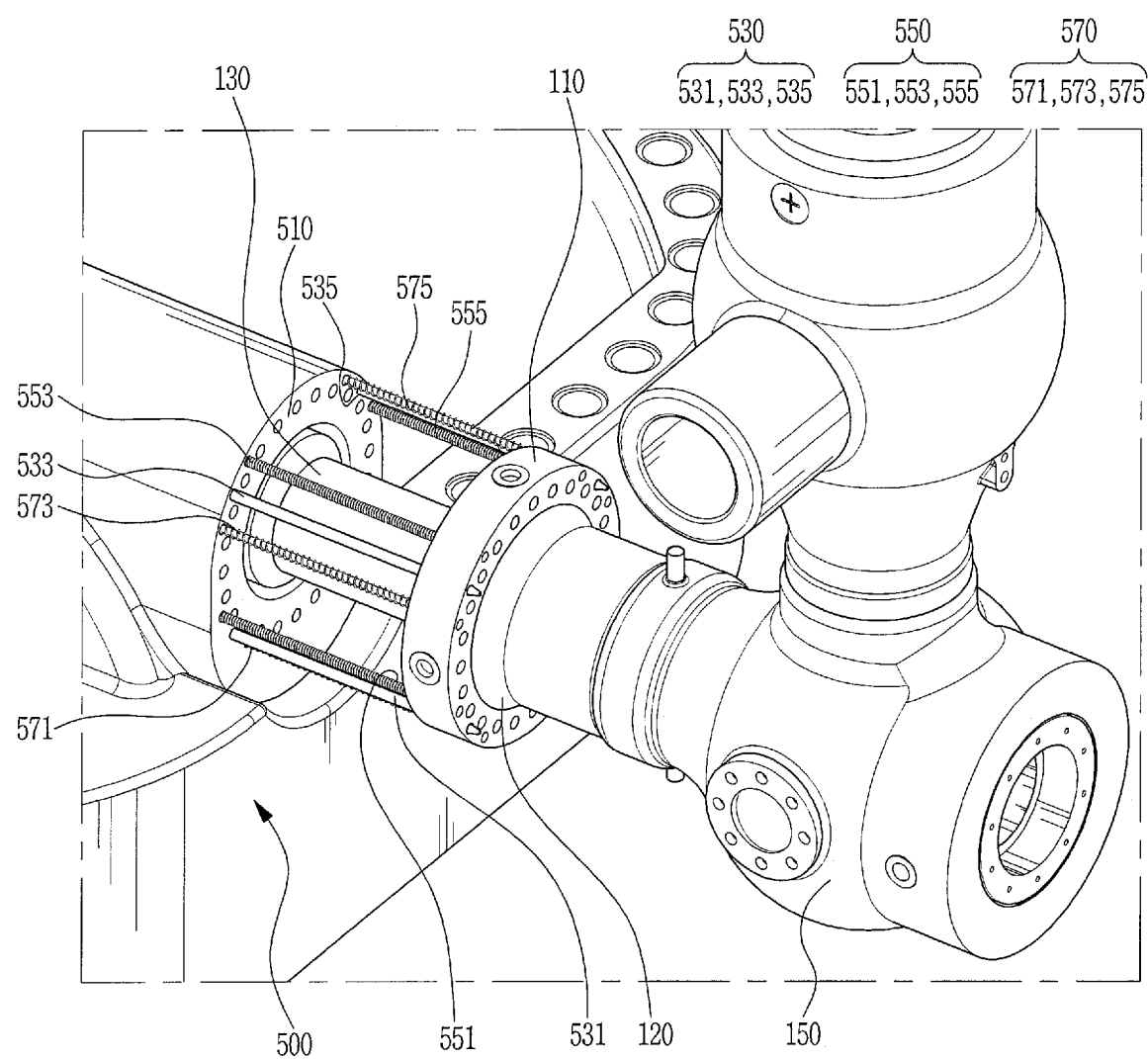

Subsequently, as shown in FIGS. 12 to 14, the screw jacks 570 are simultaneously rotated in one direction. At this time, the screw jacks 570 are moved in the same direction as the direction in which the guide rods 530 and the threaded rods 550 extend.

As a result, the second connection unit 120 becomes gradually spaced apart from the first connection unit 510, in a manner reverse to the process of assembling the steam turbine. When the screw jacks 570 are rotated simultaneously and equally, the second connection unit 120 may be correctly moved from the first connection unit 510.

During the disassembly of the steam turbine, the piston 130 is correctly moved by the screw jacks 570, making it possible to prevent the piston ring 170 from being damaged due to uneven friction between the piston ring 170 and the inner wall of the first connection unit 510, in the same manner as in the process of assembling the steam turbine.

As is apparent from the above description, in the steam turbine and the method of assembling and disassembling the same, it is possible to prevent components constituting the steam valve from being damaged during the assembly or disassembly of the steam turbine.

Although embodiments have been described with reference to a number of illustrative embodiments thereof, those skilled in the art will appreciate that the present invention can be variously modified and altered through the addition, change, or deletion of components without departing from the idea of the invention as disclosed in the accompanying claims and that such modifications and alterations fall within the scope of rights of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A steam turbine comprising a turbine main body supplied with steam from a steam supply unit and a steam valve for controlling an amount of steam to be supplied from the steam supply unit to the turbine main body,
   wherein the turbine main body comprises:
      a first connection unit; and
      a plurality of guide rods extending from the first connection unit in a first direction, and
   wherein the steam valve comprises:
      a second connection unit configured to be coupled to the first connection unit; and
      a flange disposed around the second connection unit and configured to receive the guide rods through a plurality of first through-holes respectively formed in the flange,
   wherein the first direction is a direction that faces the second connection unit from the first connection unit, and the guide rods extend from the first connection unit toward the second connection unit, when the first and second connection units are positioned for assembly.

2. The steam turbine according to claim 1, wherein the first connection unit includes an inner circumference and an end surface provided around the inner circumference.

3. The steam turbine according to claim 2, wherein the guide rods are arranged symmetrically around the inner circumference of the first connection unit.

4. The steam turbine according to claim 2, wherein the guide rods are fixedly coupled to the end surface of the first connection unit.

5. The steam turbine according to claim 1, wherein the turbine main body further comprises a plurality of threaded rods extending in the first direction.

6. The steam turbine according to claim 5, wherein the threaded rods are fixedly coupled to the first connection unit adjacent to the guide rods.

7. The steam turbine according to claim 5, wherein the flange is further configured to receive the threaded rods through a plurality of second through-holes respectively formed in the flange adjacent to the first through-holes.

8. The steam turbine according to claim 7, wherein each of the threaded rods has an outer diameter smaller than an inner diameter of a corresponding one of the second through-holes, and
wherein the turbine main body further comprises a plurality of nuts respectively fitted onto the threaded rods for moving the steam valve toward the turbine main body.

9. The steam turbine according to claim 1, wherein each of the guide rods includes a distal end formed to have a tapered surface.

10. The steam turbine according to claim 1, wherein each of the guide rods is formed to have a cylindrical shape and a flat side surface.

11. The steam turbine according to claim 1, wherein the flange is further configured to receive a plurality of screw jacks through a plurality of third through-holes respectively formed in the flange adjacent to the first through-holes.

12. A method of assembling a steam turbine, the method comprising:
preparing a turbine main body comprising a turbine unit configured to be rotated by a supply of steam, a first connection unit configured to receive the supply of steam, a plurality of guide rods extending from the first connection unit in a first direction, and a plurality of threaded rods disposed so as to be adjacent to the guide rods, the threaded rods extending in the first direction;
preparing a steam valve configured to control an amount of steam to be supplied into the turbine main body, the steam valve comprising a second connection unit disposed so as to face the first connection unit, and a flange disposed around the second connection unit and configured to receive the guide rods through a plurality of first through-holes respectively formed in the flange and to receive the threaded rods through a plurality of second through-holes respectively formed in the flange adjacent to the first through-holes;
moving the steam valve toward the turbine main body in opposition to the first direction such that a distal end of each of the guide rods is inserted into a corresponding one of the first through-holes;
further moving the steam valve toward the turbine main body after the guide rod insertion, such that a nut-receiving end of each of the threaded rods is inserted through a corresponding one of the second through-holes;
fitting each of a plurality of nuts onto the nut-receiving end of a corresponding one of the threaded rods, after the threaded rod insertion; and
rotating the nuts such that the first connection unit and the second connection unit come into tight contact with each other.

13. The method according to claim 12, wherein the rotating the nuts comprises simultaneously moving the nuts toward the turbine main body.

14. The method according to claim 13, wherein the simultaneously moving the nuts comprises moving each of the nuts an equal distance in opposition to the first direction.

15. The method according to claim 12, wherein the first connection unit includes an inner circumference and an end surface provided around the inner circumference, and the guide rods are arranged symmetrically around the inner circumference of the first connection unit.

16. The method according to claim 12, wherein the first connection unit includes an inner circumference and an end surface provided around the inner circumference, and the guide rods are fixedly coupled to the end surface of the first connection unit.

17. The method according to claim 12, wherein the first connection unit includes an inner circumference and an end surface provided around the inner circumference, and the threaded rods are fixedly coupled to the end surface of the first connection unit adjacent to the guide rods, and
wherein each of the threaded rods has an outer diameter smaller than an inner diameter of a corresponding one of the second through-holes.

18. A method of disassembling a steam turbine, the method comprising:
preparing a turbine main body and a steam valve configured to control an amount of steam to be supplied into the turbine main body,
the turbine main body comprising a turbine unit configured to be rotated by a supply of steam, a first connection unit configured to receive the supply of steam, a plurality of guide rods extending from the first connection unit in a first direction, and a plurality of threaded rods disposed so as to be adjacent to the guide rods, the threaded rods extending in the first direction, and
the steam valve comprising a second connection unit disposed in a state of being in tight contact with the first connection unit, and a flange disposed around the second connection unit and configured to receive the guide rods through a plurality of first through-holes respectively formed in the flange, to receive the threaded rods through a plurality of second through-holes respectively formed in the flange adjacent to the first through-holes, and to receive a plurality of screw jacks through a plurality of third through-holes respectively formed in the flange adjacent to the first through-holes;
inserting each of the screw jacks into a corresponding one of the third through-holes, from the steam valve toward the turbine main body in opposition to the first direction; and
actuating the screw jacks such that the steam valve is separated from the turbine main body in the first direction.

19. The method according to claim 18, wherein the first connection unit includes an inner circumference and an end surface provided around the inner circumference, and the guide rods are arranged symmetrically around the inner circumference of the first connection unit.

20. The method according to claim 19, wherein the screw jacks are applied around the flange in a symmetrical fashion corresponding to the arrangement of the guide rods.

* * * * *